US008100648B2

(12) United States Patent
Carr

(10) Patent No.: US 8,100,648 B2
(45) Date of Patent: Jan. 24, 2012

(54) SUBMERSIBLE ROTOR DESIGN

(76) Inventor: Fred K. Carr, Chapel Hill, NC (US)

( * ) Notice: Subject to any disclaimer, the term of this patent is extended or adjusted under 35 U.S.C. 154(b) by 137 days.

(21) Appl. No.: 12/657,266

(22) Filed: Jan. 19, 2010

(65) Prior Publication Data

US 2010/0187826 A1 Jul. 29, 2010

Related U.S. Application Data

(63) Continuation-in-part of application No. 12/361,179, filed on Jan. 28, 2009, now Pat. No. 7,736,127.

(51) Int. Cl.
*F03B 3/06* (2006.01)
*F03B 3/12* (2006.01)
*F03B 3/14* (2006.01)

(52) U.S. Cl. ......... 416/1; 416/205; 416/207; 416/197 R; 416/238; 416/243; 416/DIG. 2; 416/DIG. 5; 416/223 R; 416/228; 290/54

(58) Field of Classification Search .................. 415/3.1, 415/4.3, 4.5, 906, 908; 416/1, 197 R, 197 A, 416/205–207, 223 R, 228, 238, 243, DIG. 2, 416/DIG. 5; 290/43, 44, 54, 55
See application file for complete search history.

(56) References Cited

U.S. PATENT DOCUMENTS 3,594,099 A * 7/1971 Herbert ........................ 416/207
4,168,939 A * 9/1979 Schmitz et al. ............... 416/228
4,256,435 A * 3/1981 Eckel ........................ 415/209.1
4,692,097 A * 9/1987 Bibollet ........................ 416/207
5,611,665 A * 3/1997 Angel .............................. 416/1
5,997,253 A * 12/1999 Feehan ........................ 416/207
6,302,652 B1 * 10/2001 Roberts ........................ 416/228
6,558,122 B1 * 5/2003 Xu et al. .................. 416/223 A
7,378,750 B2 * 5/2008 Williams ........................ 290/43
7,385,302 B2 * 6/2008 Jonsson .......................... 290/54
7,736,127 B1 * 6/2010 Carr ................................. 416/1
7,854,595 B2 * 12/2010 Kinzie et al. .................. 416/228
7,976,280 B2 * 7/2011 Brittingham et al. ......... 416/189
2008/0138206 A1 * 6/2008 Corren ...................... 416/223 R
2011/0027089 A1 * 2/2011 Scarpelli .................. 416/197 A

* cited by examiner

*Primary Examiner* — Christopher Verdier
(74) *Attorney, Agent, or Firm* — Fred K. Carr

(57) ABSTRACT

An improved rotor blade used in combination with a submersible electrical generator comprises a rotor base with width BW, a leading edge, a tip, and a trailing edge. The leading edge and the trailing edge are defined as elliptical curves having a radius of 8.0 BW. The rotor has a surface area profile substantially in accordance with the Cartesian coordinate values X and Y set forth in Table I. The rotor blade can be functionally connected to a rotor shaft through a pivotal support axial which allows the pitch of the blade to be set and maintained. The pitch is set to harness the kinetic energy of flowing water for generating electricity.

10 Claims, 2 Drawing Sheets

Y
16
21
15
LINE I
11
17
20
45°
14
13
12
BW
X

SUBMERSIBLE ROTOR DESIGN

RELATED APPLICATIONS

This application is a continuation-in-part application of U.S. application Ser. No. 12/361,179, filed Jan. 28, 2009, now U.S. Pat. No. 7,736,127.

BACKGROUND OF THE INVENTION

1. Field of the Invention

The present invention relates to the generation of electrical power from submerged generators using water currents to turn the generators, and in particular, the surface area profile of the rotor blade used on the generators.

2. Description of the Prior Art

Waves are created by winds blowing over large bodies of water; tidal changes in the sea are generated by solar and lunar gravitational forces. As the earth rotates the elliptical envelope shape of the ocean floor causes the water level to rise and fall. Ocean waves and tides contain tremendous amounts of kinetic energy which can be harnessed to turn generators for the production of electricity. Water is several hundred times denser than air, therefore, has more kinetic energy per unit speed. Submersible generators harness the kinetic energy to turn the generators.

The eastward rotation of the Earth generates the winds which cause the waves; the Gulf Stream and the Kuroshio are two natural currents resulting from the Earth's rotation. The Gulf Stream starts just south of the Florida Keys and continues north for about 400 miles. The current has an average speed between 4-7 miles per hour depending on width. So long as the Earth rotates eastward, there will be winds generating waves and currents. Tidal changes result from lunar and solar gravitational forces. This enormous power, if appropriately harnessed, is fuel that is cost-free, non-polluting, and self-sustaining. Tidal currents are predictable for the years in advance; wave patterns are predictable for days in advance. Predictability is an important characteristic for an energy source used in electricity generated for input into an electric grid where the supply equals demand.

The present disclosure is concerned with harnessing tidal power which is generated by lunar and solar gravitational forces as the Earth rotates eastward. It could be adapted for the more powerful currents occurring in the Gulf Stream which are caused by winds, uneven temperatures, and the shape of existing land masses. Tidal currents are the periodic motion of water caused by the different lunar and solar gravitational attractive forces on different parts of the eastward rotating Earth. As these gravitational forces change, tides rise and fall causing periodic horizontal movement of water, the tidal currents. The tidal current speed varies from place to place depending on the shape of the coastline being strongest in inlets, sounds, coastal waterways, and related. Since the amount of electricity generated depends on the speed and steadiness of the water driving the generating device, the tidal currents can produce electricity only between high tides and low tides.

The extraction of kinetic energy from flowing water is an extremely complex operation and several devices have been tested. The most common are horizontal-axis devices in which the axis of rotation of the rotor is horizontal with respect to the ground and parallel to the energy stream. Generators are well known in the prior art, several models are available commercially which are usable in either wind or water provided the water unit has a water-proof housing. The kinetic energy of the water turns a rotor blade which is attached to a rotor shaft which extends into the generator. A series of step-up gears increase the rotational speed such that electricity is generated.

The rotor blades used on wind turbines tend to be long and narrow since this design is easier to secure during violent wind storms. The long and narrow rotor blade design has been tested with water turbine systems, but has encountered several problems. The two major problems are injury to fish and other marine species, and the blades can be damaged by seaweed and other submerged debris in the water. The long, sweeping motion of the rotor blades tend to attract fish and injure them as they swim by in the sweep path of the rotor blades. In addition, these blades tend to collect and retain seaweed and other debris which cause structural damage.

U.S. Pat. No. 6,302,652, issued to John Roberts, and US application 2008/0138206, Dean Corren inventor, relate to curved rotor blades.

The above references fail to at least teach or suggest the design of the presently disclosed and claimed invention.

BRIEF SUMMARY OF THE INVENTION

The rotor blade system disclosed in U.S. Pat. No. 7,736,127 can be defined as a rotor blade having a base of Width BW, a leading edge, a tip, a trailing edge, where the leading edge begins at the front end of the base and extends upward to the tip, the trailing edge begins at the tip and extends to the back end of the base. The leading edge and the trailing edge are further defined as having elliptically curved edges formed by a radius of eight times the base Width, 8(BW), where a straight line drawn from the front of the rotor base to the rotor tip forms a forty five degree angle with respect to the rotor base. The rotor blade is functionally connected to a rotor shaft which serves as the axis of rotation, where one end of the rotor shaft extends into a generator and the other end has a perpendicular pivotal support axial extending through a channel in the hub up to the center of the rotor blade providing a pivotal axial for setting the pitch of the rotor blade relative to the axis of rotation. The pitch can be preset and maintained for operation through a locking pin mechanism. The system is submerged with the axis of rotation parallel to flowing water such that the kinetic energy in the water turns the rotor blade converting the kinetic energy to rotation mechanical energy which is transferred through the rotor shaft to a generator for generating electricity which is transferred to an electric grid for use.

The elliptically curved design of the previous disclosure and present invention was derived to address two major problems encountered with prior art designs: fish kill and other marine species injury, and the retention of seaweed and other debris on the rotor which can cause damage. The wider the rotor sweep path, that is the diameter from rotor tip to rotor tip, the greater the potential for fish kill and other marine species injury. The elliptically curved design of the present blade decreases the rotor sweep path since the blade is set at an angle relative to the axis of rotation. In addition, the elliptically curved design set at an angle in the rotor path tends to push the fish aside rather than injury them. In addition, the curved design of the disclosure allows the seaweed and other debris to slide along the top of the curved blade rather than being entrapped on it as with the prior art straight edge blades. The curved design allows the currents to push the weed along the top off into the water.

The present invention defines the surface area shape of the rotor blade in accordance with an intermediate portion of the Cartesian coordinate values of x and y as set forth in Table 1. The x and y values are distances, when continuously connected by appropriate curves, that define the profile of the surface area of the rotor blade at each x and y distance. Table I sets forth the variable x and y values of the rotor tip where the rotor base is held constant on the x axis where y is equal to zero.

Accordingly, the primary objective of this invention is to provide a turbine rotor blade for use with a submerged generator placed roughly parallel in flowing water where the kinetic energy in the flowing water causes the rotor to turn which spins the generator generating electricity.

A further objective of the invention is to provide a variable pitch rotor blade where the pitch of the blade relative to the flow of water is adjusted and maintained.

A further objective of the invention is to provide a rotor blade which is functionally connected to a rotor shaft through a perpendicular pivotal support axial such that the pitch of the blade can be adjusted and maintained where the kinetic energy of the flowing water is transferred to the generator through the rotor shaft as rotational energy.

A further objective of the invention is to provide a rotor which has a smaller rotor sweep path diameter compared to straight edge blades.

A further objective of the invention is to provide a rotor blade which has an elliptically curved edge design allowing seaweed and other submerged debris to slide off the tip into the current rather than being trapped as with prior art deigns.

A further objective of the invention is to provide a rotor design where the surface area profile is defined by Cartesian coordinate values.

BRIEF DESCRIPTION OF THE DRAWINGS

Other features of the present invention will become more evident from a consideration of the following patent drawings which form a part of this specification.

DETAILED DESCRIPTION OF THE INVENTION

Figure 1:
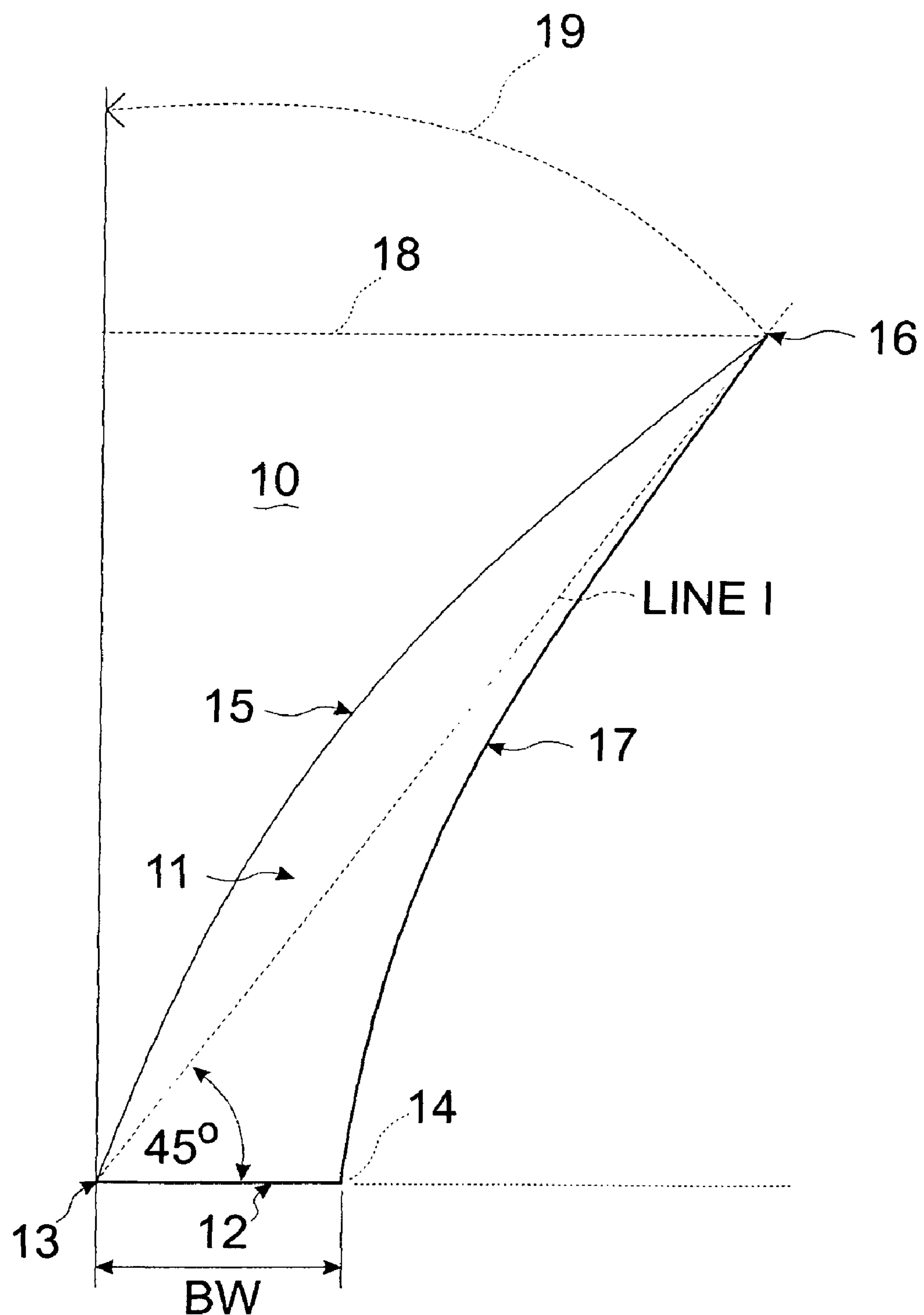
FIG. 1 is a schematic side view of the rotor blade disclosed in U.S. Pat. No. 7,736,127.

Submersible electronic generating systems are placed in flowing water where the kinetic energy in the water current causes rotor blades to rotate which turn a rotor shaft for generating electricity. Water is several hundred times denser than air, therefore, flowing water is a powerful force. The kinetic energy in the flowing water is converted to rotational mechanical energy which turns the generator producing electricity. The electricity is delivered to a power grid through a power cable. A support frame maintains the generating system in the submerged position.

Wind turbines were put into practice several years ago, and tend to have rotor blades which are long and slender since these are easier to secure during violent winds. Many of the structural design features of the wind turbines have been kept in place as turbines progressed from wind to water as the source for kinetic energy, this is especially true for the rotor blades.

Prototype testing thus far for water turbine systems has demonstrated several problems which must be addressed before these systems can be successfully commercialized. The problems include injury to fish and other marine species from the turning of the rotor blades, and the blades tend to retain seaweed and other submerged debris which can cause structural damage. In addition, the long rotor sweep, the distance from rotor tip to rotor tip, necessitates that these systems be placed deep in the water to prevent damage to boats and other structures on the water surface.

One of the above problems is environmental and the other structural. The environmental problem is marine species injury, which is significant. The term "crusinart effect" has been used in the literature to describe the fish and other marine species injury caused by the prior art blades. The rotating blades tend to attract the fish, the long slender design generates a wide sweep path causing injury when the fish enter the sweep path. The present design has a smaller sweep path, and is designed to push the fish aside. The elliptically curved design allows seaweed and other debris to slid off with the currents The wide rotor sweep path of the prior art blades has another disadvantage. The wider the sweep path, the deeper the system has to be installed to prevent damage to structures such as boats on or near the surface. The deeper the installation, the more challenging it is. Also in many of the inlets and sounds where tidal currents would occur, the water is not deep enough for installation of systems with wide sweep paths. The rotating blade would come too near the surface.

The rotor blade design disclosed in U.S. Pat. No. 7,736,127 has elliptically curved edges rather than the straight edge design of prior art rotor blades, and the blade is set at an angle with respect to the axis of rotation. This structural design provides for several improvements discussed above including decreased fish injury and the curved edges allow debris to slide along the edges and off into the currents. Also, the design significantly decreases the sweep path so that the system does not have to be positioned as deep in the water.

Rotor blades, in general, have a rotor base, a leading edge, a tip, and a trailing edge. The kinetic energy of the moving water turns the rotor blades thereby converting the kinetic energy into rotation mechanical energy which is transferred to a step-up gears through the rotor shaft. A step-up gear increases the rotational speed through a series of gears. Gear boxes typically contain planetary and helical gears for converting low speed to a higher speed which drives a high speed shaft to generate electricity, which constitutes a step-up gear means. Turbine step-up gears are widely used today, for example, in wind turbines and are commercially available. The increased rotational speed turns the generator. Generators are also well known in the art and are used in hydroelectric and wind turbines. Several models are commercially available, General Electric being a large supplier. Water generators have a water tight housing forming a water tight nacelle. The generator, step-up gears and water tight housing constitute a generator means.

A support frame maintains the generating system in the flowing water. In one embodiment the support frame is mounted to a frame support foundation in the water, however, the support frame may be attached many ways known to one skilled in the art including existing structures as bridges and docks as well as to floating structures as ships and barges. The support frame is essentially a support member attached at one end to the generator housing and at other end to a solid structure, bridge, or floating device. When taken together, these constitute a support means.

The elliptical curve of the leading edge starts at the front end of rotor base and continues to the tip. The elliptical curve of the trailing edge starts at rear end of base and continues to the rotor tip. The length of the Radius Line forming the elliptical curves is approximately eight times rotor base width.

Referring now to FIG. 1, there is shown a schematic side view of a rotor blade, generally designated 10, defined by the Cartesian coordinate system as disclosed in disclosure 371, 169. Blade 11 includes rotor base 12, front end of base 13, rear end of base 14, leading edge 15, rotor tip 16, and trailing edge 17. A straight line drawn from the front of base 13 through rotor tip 16 forms a 45 degree angle with respect to the rotor base 12. Leading edge 15 and trailing edge 17 are elliptically curved. Width of base 12, designated BW, determines the radial profile of the elliptical curves which define leading edge 15 and trailing edge 17. In the disclosed embodiment, the radial line lengths for forming the elliptically curved leading edge 15 and trailing edge 17 are approximately (8.0) BW. Width BW also determines the linear distance of Line I which goes from front of base 13 to the rotor tip 16. In the disclosed embodiment, this distance is approximately (4.0) BW.

As discussed earlier, a major disadvantage of prior art rotor blades, which tend to be long and slender, is they generate a wide sweep path. The curved design of the present and previously disclosed rotor blade inherently decreases the width of the sweep path by its structural design. This can be demonstrated by comparing the sweep path length of the presently disclosed curved design with the sweep path length of a prior art straight design. Referring further to FIG. 1, there is shown Line 18 demonstrating the sweep path of the curved design. The sweep path of a straight design, that is perpendicular to the x axis, with the same surface area is shown by arch 19. Decreasing the rotor sweep length in relation to the y axis decreases the diameter of the sweep path. The sweep path of the curved design is approximately one quarter less than the radial sweep of the straight, prior art design.

Since the rotor sweep path of the prior art rotor blades are almost one quarter greater than the sweep path of the curved design, it follows that the straight edge prior art design would have to be positioned deeper in the water to have the same clearance from the top of the sweep path to the surface. Often the sounds and inlets which have the tidal currents are not very deep. The curved rotor design with the lesser sweep path would be a better design for these shallow waters.

Figure 2:
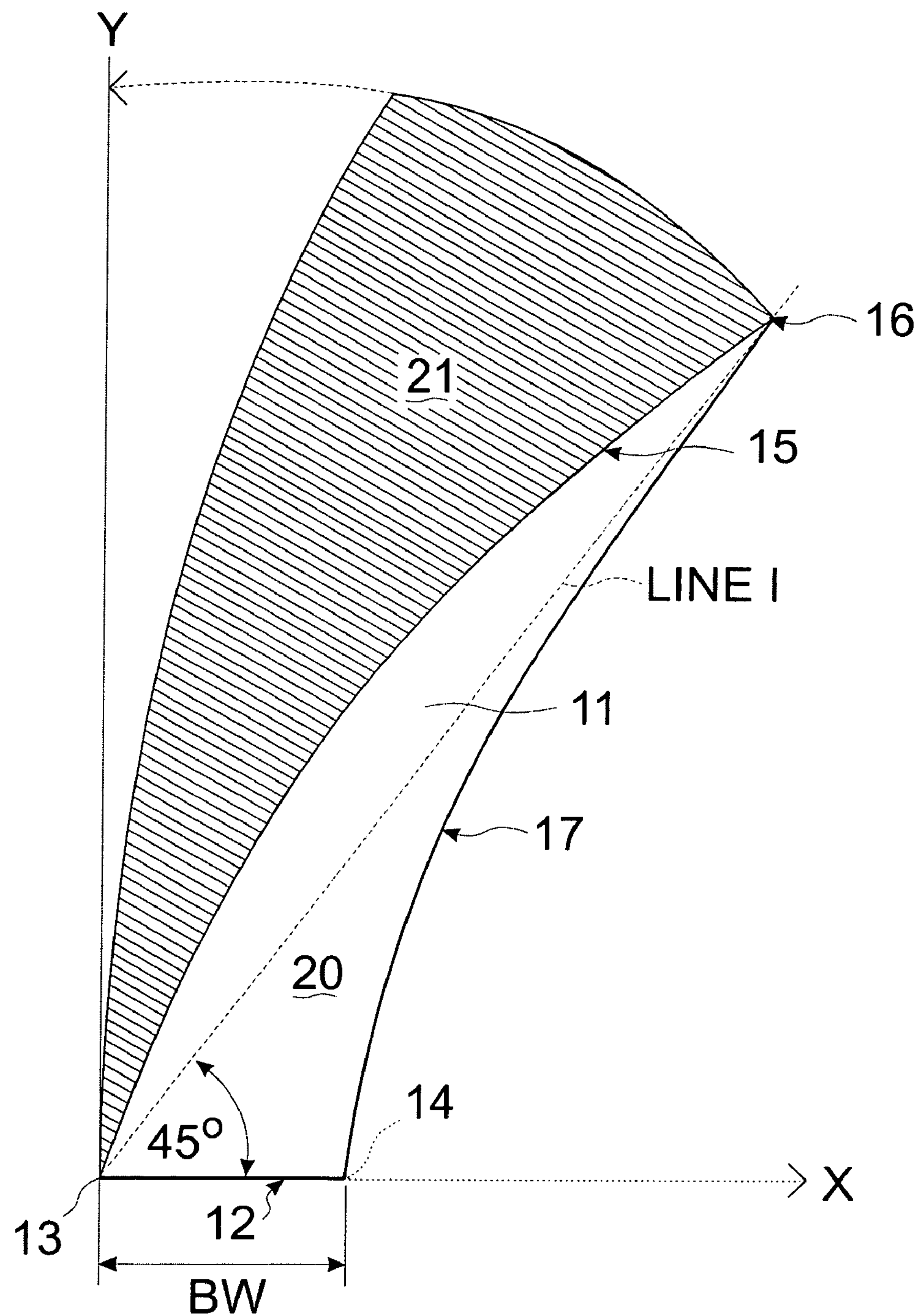
FIG. 2 is a schematic side view of the present disclosure where the solid portion is essentially the blade disclosed in U.S. Pat. No. 7,736,127 and the shaded portion is a cross-sectional side view of the present invention as defined by the Cartesian coordinates.

The overall shape, or profile, of a rotor blade can be further disclosed and claimed by Cartesian coordinates. Referring now to FIG. 2, there is shown a schematic side view of the present invention where the solid portion 20 is essentially the surface area profile of the rotor blade 11 disclosed in U.S. Pat. No. 7,736,127, and the shaded area 21 represents a cross-section side view of the present disclosure as defined by Cartesian coordinates set forth in Table 1 below. Front end of base 13 is set at x=0, y=0, rear end of base 14 is set where x equals a positive integer and y equals 0. In the shaded area 21, the rotor tip is defined by variable x and y values. In the solid area 20, rotor blade 11 is defined by surface area 20 having a surface area profile wherein a straight line drawn from front of base 13 to rotor tip 16 is forty five degrees.

Table I includes the variable x and y values of the rotor tip where the rotor base is held constant on the x axis with a y value of zero. The x and y values are rounded off to the nearest tenth. The x and y values in Table I are distances given in inches from the point of origin, but it is understood other units of dimensions may be used including metric. It is further known to those skilled in the art that the value of the rotor base 12 could be changed. Each x and y value are smoothly connected to the rotor base. The set of points of the tip are smoothly connected to the rotor base.

Table I, the x and y values of the tip where the rotor base is held constant, include x-y values of: 22-23.5, 21-24.5, 20-25.5, 19-26.4, 18-26.5, 17-27.3, 16-28, 15-28.5, 14-29, 13-29.5, 13-29, 11-30.3, 10-30, 9-31, 8-31.2, 7-31.4, 6-31.6, 5-31.8.

The rotor blades discussed above could be permanently attached to a rotor shaft as may be desirable in deep steady currents, or there can be a pivotal connection as discussed in the 361,179 disclosure where a perpendicular support axial is attached to a first end of a rotor shaft allowing the pitch to be adjusted. The rotor shaft at a second end extends into a generator for transferring the rotational mechanical energy to the generator.

Pitch describes the angle between the axis of rotation and the high pressure side of the rotor blade The Pitch determines the angle at which the water current strikes the rotor blade. In an ideal situation, the axis of rotation would be parallel to the flow of water in a horizontal-axis turbine, however, in practice this is not always the case since the exact direction of tidal currents are influenced by several factors including wind.

If Pitch were set such that the high pressure side were parallel to the current flow, it follows the rotor blade would not turn. This would be desirable during violent current conditions to protect the generator. If the Pitch were set at ninety degrees, the high pressure side would effectively block the current and the blade would not turn with a regular pattern. Therefore Pitch is set somewhere between the two during operation, usually between thirty and sixty degrees. As used herein, the term “zero” pitch indicates that the axis of rotation and the high pressure side of the rotor blade are in the same plane, that is, there is no angle of pitch between the two.

Tidal currents flow inward during high tides and outward during low tides twice per day. To harvest the kinetic energy during the bi-directional flow cycles, the direction of the generator would either have to be reversed, or the angle of the rotor blades would have to be reversed for out-flow. The pivotal support axial design would allow for changing the direction of the rotor blade such as to be effective in bi-directional currents. The reversal of direction may be obtained by the method disclosed in U.S. Pat. No. 7,736,127 or by a microprocessor as disclosed in a commonly filed application.

In summary, the rotor blade 11 of the present disclosure is defined as a blade having a rotor base 12 with Width BW, a leading edge 15, a tip 16, and a trailing edge 17. The leading edge begins at the front of the base 13 and continues to the rotor tip 16, and the trailing edge 17 begins at the rear of base 14 and continues to the rotor tip 17. The leading edge 16 and the trailing edge 17 are further defined as elliptical curves which have a radius of eight times the base width. The rotor blade includes a surface area profile substantially in accordance with at least a portion of the Cartesian coordinate values x and y set forth in Table I, where the x and y values denote the rotor tip. The x and y values are distances, which when continuously connected by an elliptical curve to the rotor base define a rotor profile at each x and y value. The rotor blade is used to capture the kinetic energy of flowing water which is transferred to a generator as rotational mechanical energy through a rotor shaft. The rotor blade is functionally connected to the rotor shaft through a perpendicular pivotal support axial which allows the pitch of the rotor blade to be adjusted. The rotor shaft transfers the rotational mechanical energy to a step-up gear box which increases the rotational speed sufficient to generate electricity which is transferred to an electric grid.

The present invention may, of course, be carried out in ways other than those herein set forth without parting from the spirit and essential characteristics of the invention. The present embodiments are therefore to be considered in all respects as illustrative and not restrictive, and all changes coming within the meaning and equivalency range of the appended claims are intended to be embraced therein.

What is claimed is:

1. A submersible electrical power generating system including a generator means for generating electricity having a support means for positioning and maintaining said generator means in a water current, comprising: a rotor blade, oriented about a horizontal axis of rotation parallel to said water current, having a rotor base with Width BW, a leading edge, a tip, and a trailing edge, where said leading edge begins at a front end of said base and continues to said tip and said trailing edge begins at said tip and continues to a back of said base, where said leading edge and said trailing edge are further defined as elliptical curves having a radius of eight times said Width BW where the kinetic energy in said water current causes said rotor blade to turn converting said kinetic energy to rotational mechanical energy, where said rotor blade is functionally connected to a first end of a rotor shaft forming at its center said axis of rotation where a second end of said rotor shaft functionally extends interior to said generator means for transferring said rotational mechanical energy, where the surface area of said rotor blade is defined by a profile substantially in accordance with Cartesian coordinates values of X and Y set forth in Table I wherein the point of origin is said rotor base which is constantly set on the X axis and the X and Y values of said tip are variably set forth in said Table I defining the profile at each X and Y value which when connected to said rotor base by said elliptical curves define the profile of said rotor blade at each X and Y value.

2. The power generating system as recited in claim 1, wherein said X and Y values of said tip as set forth in said Table I are between the Y axis and LINE 1, where Line 1 represents a straight line drawn from said rotor base to said tip which forms a forty five degree angle.

3. The power generating system as recited in claim 1, further comprising a perpendicular pivotal support axial attached to said first end of said rotor shaft for pivotally connecting said rotor blade to said rotor shaft such that the pitch of said rotor blade can be adjusted by pivoting said rotor blade around said pivotal support axial whereby the pitch is set.

4. The power generating system as recited in claim 3, wherein said X and Y values set forth in Table I define a set of points for said tip which when smoothly connected to said rotor base by said elliptical curves form a rotor blade profile, which when functionally connected to said pivotal support axial form the pivotal rotor blade with adjustable pitch.

5. The power generating system as recited in claim 4, wherein said pitch of said pivotal rotor blade is set between 30 to 60 degrees during operations.

6. The power generating system as recited in claim 4, wherein said pitch is set at zero degrees as may be desirable during violent currents.

7. The power generating system as recited in claim 4, further comprising a securing ring perpendicularly attached to said pivotal support axial for securing said pivotal rotor blade to said rotor shaft.

8. The power generating system as recited in claim 7, further comprising a securing lock means for maintaining a pre-set pitch.

9. A method for generating electricity with a submersible electrical power generating system which includes a generator means for generating electricity having a support means for positioning and maintaining said generator means in a water current, the method comprising the following steps:

a. harnessing the kinetic energy of flowing water by placing said generator means parallel to said water current, where said generator means is functionally connected to a rotor blade which has a rotor base with Width BW, a leading edge, a tip, and a trailing edge, where said leading edge begins at a front end of said rotor base and extends to said tip and said trailing edge begins at said tip and continues to a back end of said rotor base, where said leading edge and trailing edge are defined as elliptical curves having a radius of eight times the Width BW, where the surface area of said rotor blade is further defined by a profile substantially in accordance with Cartesian coordinate values of X and Y set forth in Table I, wherein the point of origin of said rotor base is constantly set on the X axis where the X and Y values of said tip are variable as set forth in said Table I defining the profile at each X and Y value which when smoothly connected to said rotor base by said elliptical curves define the profile of said rotor blade at each X and Y value;

b. connecting said rotor blade to a rotor shaft through a perpendicular pivotal support axial such that said rotor blade can be pivoted around said pivotal support axial to adjust the pitch;

c. setting the pitch of said rotor blade relative to said rotor shaft at an angle sufficient to cause said rotor blade to turn when water strikes said leading edge flowing back to said trailing edge thereby converting the kinetic energy of the flowing water to rotational mechanical energy;

d. transferring said rotational mechanical energy to a step-up gear box functionally connected to said generator means through said rotor shaft which is positioned at the axis of rotation and has an internal end extending into said gear box and an external end having said perpendicular pivotal support axial which extends through a channel in a hub functionally connecting said rotor blade to said rotor shaft thereby providing a pivotal means for adjusting pitch of said rotor blade relative to said hub; and e. increasing the rotational speed with said gear box transferring the mechanical energy to said generator means for generating and delivering electricity to an electric grid.

10. The method as recited in claim 9, wherein step c is practiced by setting said pitch to between thirty and sixty degrees during operations.

* * * * *